June 23, 1964     O. MITCHELL     3,138,085
AUTOMOBILE AIR CONDITIONING FRONT PANEL ASSEMBLY
Filed April 5, 1962     3 Sheets-Sheet 1

INVENTOR
ORVILLE MITCHELL
BY
Kingsland, Rogers, Ezell & Robbins

ATTORNEYS

June 23, 1964     O. MITCHELL     3,138,085
AUTOMOBILE AIR CONDITIONING FRONT PANEL ASSEMBLY
Filed April 5, 1962     3 Sheets-Sheet 2
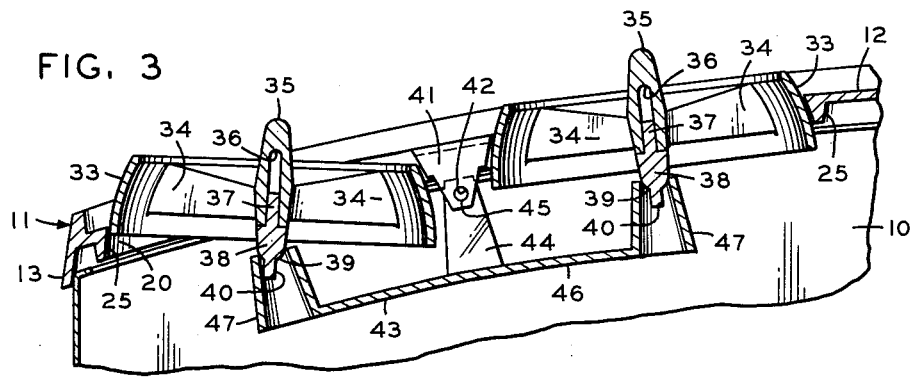
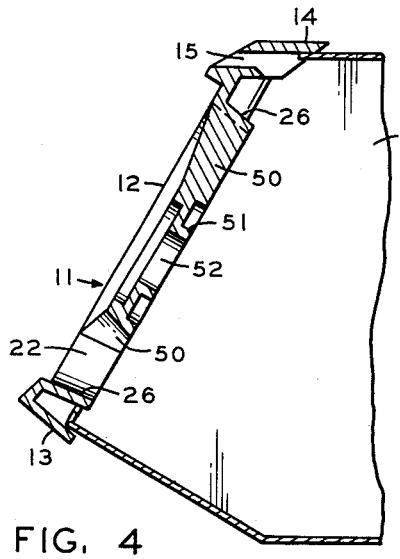
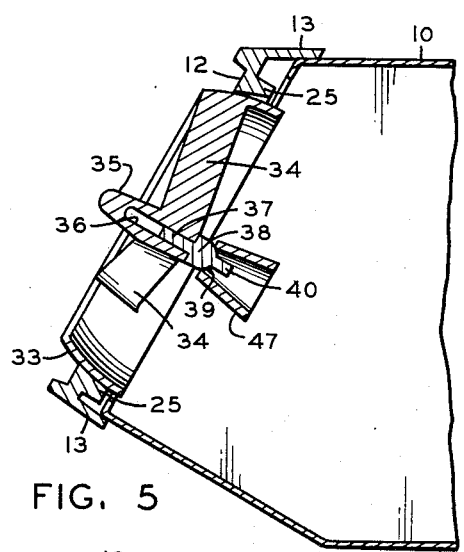
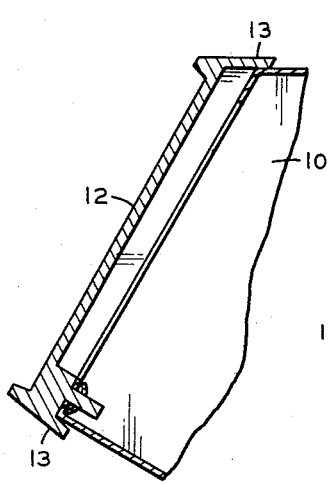
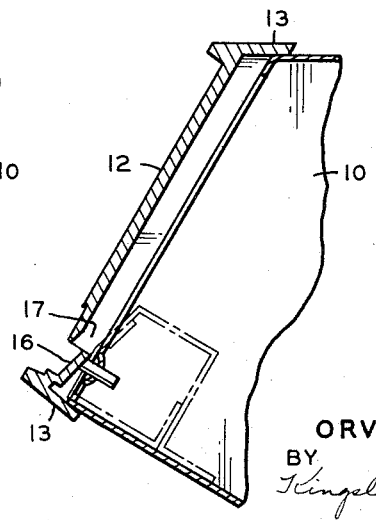
INVENTOR
ORVILLE MITCHELL
BY
Kingsland, Rogers, Ezell & Robbins
ATTORNEYS

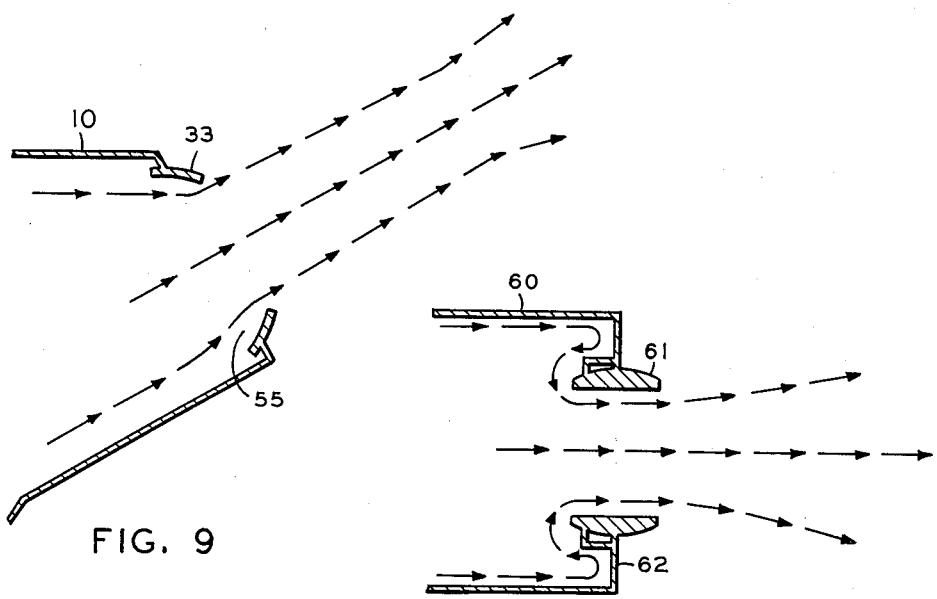
FIG. 9
FIG. 10
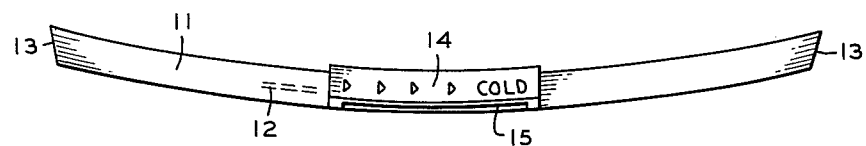
FIG. 8

United States Patent Office 3,138,085
Patented June 23, 1964

3,138,085
AUTOMOBILE AIR CONDITIONING FRONT
PANEL ASSEMBLY
Orville Mitchell, Dallas, Tex., assignor to John E. Mitchell
Company, Dallas, Tex., a corporation of Missouri
Filed Apr. 5, 1962, Ser. No. 185,379
3 Claims. (Cl. 98—2)

This invention relates to an automobile air conditioner front panel assembly, and particularly to such a panel assembly which is capable of directing cool air uniformly to all areas within an automobile compartment and which is easy to regulate by the user.

The panel assembly of this invention comprises a panel which supports a plurality of adjustable air directors. The panel is mounted on the front of an evaporator housing and the air is discharged through the air directors. One of the features of the invention is that, instead of being flat, the panel is arcuate. Furthermore, the air directors are designed in a converging configuration along the direction of air flow through them to provide directional control over the air stream through any air director.

A general object of this invention is to provide a front panel assembly for attachment to an evaporator housing of an automobile air conditioner which is so shaped and supports air directing components which are so designed that air can be distributed to all parts within an automobile compartment and the distribution of air can be accurately controlled.

Another object of the invention is to provide a front panel assembly for an automobile air conditioner that has adjustable air directors that are easy to regulate in position and that are easy to install and remove for replacement or other purposes.

Other objects and advantages will be apparent to those skilled in the art.

In the drawings:

FIGURE 3 is a view in section on an enlarged scale taken along the line 3—3 of FIGURE 1;

FIGURE 4 is a view in section on an enlarged scale taken along the line 4—4 of FIGURE 1;

FIGURE 5 is a view in section on an enlarged scale taken along the line 5—5 of FIGURE 1;

FIGURE 6 is a view in section on an enlarged scale taken along the line 6—6 of FIGURE 1;

FIGURE 7 is a view in section on an enlarged scale taken along the line 7—7 of FIGURE 1;

FIGURE 8 is a plan view on a reduced scale of the panel without the additional assembly components;

FIGURE 9 is a schematic view in side section showing the air flow through an air director of this invention; and FIGURE 10 is a schematic view in side section showing the air flow through an air director of a typical conventional air conditioner front panel.

Figure 1:
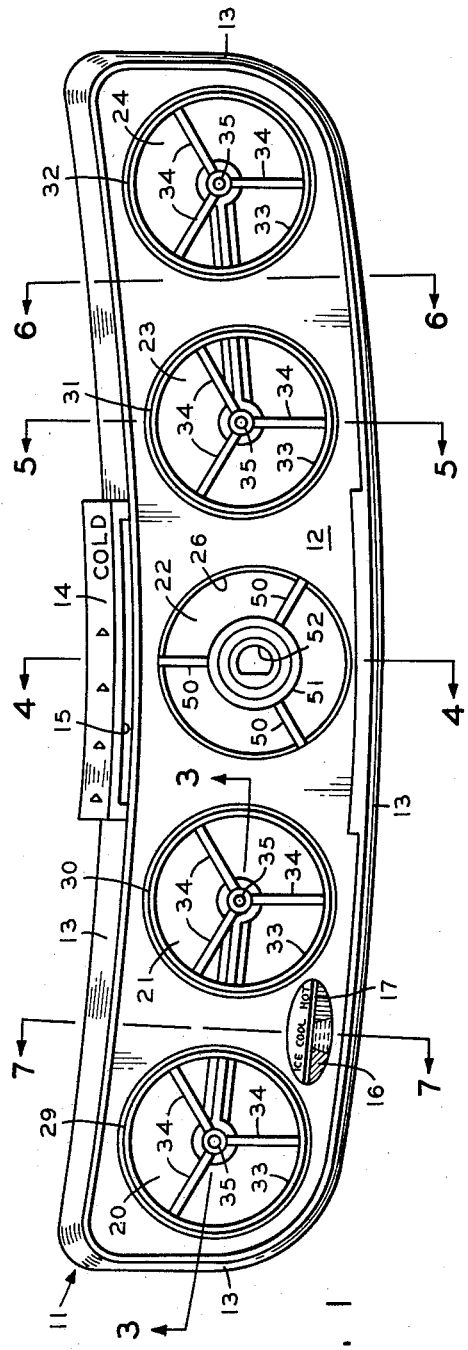
FIGURE 1 is a front elevation view of the panel assembly.
Figure 2:
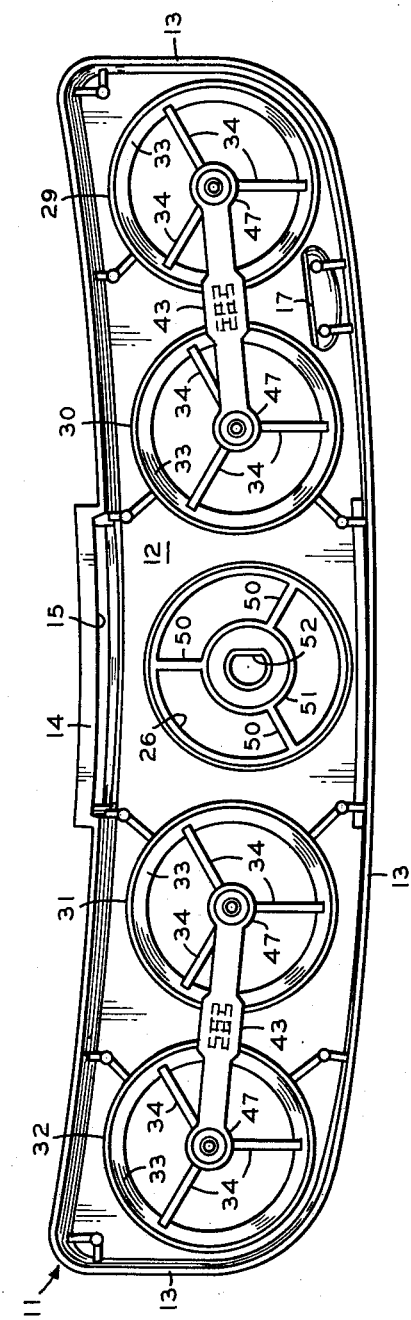
FIGURE 2 is a rear elevation view of the panel assembly.

This panel assembly comprises a number of parts, most of which are molded plastic. The assembly fits onto the front of an air conditioner 10 and is especially designed for an automobile air conditioner.

As the invention is described, it should be kept in mind that an automobile air conditioner operates in a small space but, under ideal conditions, should be capable of directing refrigerated air as desired to any part of the space.

An automobile air conditioner must of necessity take care of a comparatively great sun heat load, and operates with as much as 40° temperature change as air goes through the evaporator. Return air may be 90° when discharge air is 50°. The 90° air cannot be a condition of comfort, but 50° air directed upon a passenger dissipates any 90° air next to the passenger. Under these conditions, the device is not a space cooler, as in an insulated room with little noticeable air movement; but, rather is a spot cooler with air directed so as to be very much in evidence and definitely felt.

Many different kinds of automobile air conditioners are currently available and the positions of the air outlet vents vary with different models, especially when original equipment installations are considered.

A common refrigerated air discharge location is adjacent to the side walls of the car, in the dash panel. If an attempt is made, from this position, to direct air along the window surfaces to rear seat passengers, the 50° air may pick up enough heat from the sunny windows to rise to 80°, and the rear seat passengers are not at all comfortable.

However, on separately available, separately installed air conditioners, the evaporator coil and air outlet vents are usually mounted within and on a single housing which is normally installed beneath the front dash of an automobile at the center thereof. It is for this kind of an automobile air conditioner that the present invention is especially designed.

In connection with the problems of precisely directing air to any passenger in the automobile, it should be particularly borne in mind that even when the air outlet vents are clustered together on the front of a separately installed evaporator coil beneath the center of the dash, the problems of cool air directing can be great. The cold air, which tends to fall, must be raised from the low position of the air outlet vents, and some of the air must be distributed laterally from the front panel toward the driver and passenger in the front of the automobile compartment. Also the passengers in the rear, next to the windows, each need a stream of cold air directly from the evaporator without obstruction caused by another passenger.

This invention solves these problems of a compact air vent front panel assembly. The invention includes a panel 11 to which all of the other components are attached and which mounts on the front of an evaporator coil housing 10. The panel 11 is made of molded high temperature plastic and comprises a front plate 12 with rearwardly extending flanges 13 surrounding the plate 12. As shown in FIGURES 3, 4, and 5, the flanges 13 engage appropriate walls on the evaporator housing 10 and support the panel 11 at an upwardly inclined angle of approximately 30°. The panel 11 has suitable stamped indicia 14 adjacent the slot 15 for a temperature control lever (now shown) and suitable indicia 16 adjacent a slot 17 for a needle evaporator temperature indicator (not shown). These indicia are not special elements of this invention and might be differently placed or eliminated according to the kind of automobile air conditioner involved.

As particularly shown in FIGURES 3 and 8, the panel 11 is arcuate to provide a greater angle of air direction from the air directors which will be presently described. Obviously, the front of the evaporator housing 10 must be designed to receive the arcuate panel 11.

There are five holes 20, 21, 22, 23 and 24 through the front plate 12 of the panel 11. These holes 20–24 are evenly spaced along the width of the panel. The outer holes 20, 21, 23 and 24 are surrounded by diverging sleeves 25 which extend rearwardly from the front plate 12. The inner wall of each sleeve 25 is preferably shaped as a segment of a sphere, but may be conical.

There is a rearwardly extending sleeve 26 surrounding the central hole 22 in the front plate 12. The sleeve 26 need not be diverging nor have a spherical shaped surface.

There are four air directors 29, 30, 31 and 32 received within the diverging sleeves 25 adjacent the holes 20, 21, 23 and 24, respectively. Each of the air directors 29, 30, 31 and 32 comprises a ring 33, the inner and outer surfaces (and especially the outer surface) of which are shaped as segments of a sphere. The rings 33 are deeper than the sleeves 25, and when the rings are parallel to the front plate 12, they project both forward and rearward of the sleeves 25. Since the outer surface of the rings 33 bear against the inner surfaces of the sleeves 25, the sleeves 25 provide a bearing surface for the rings against which the rings are freely slidable.

There are three spokes 34 which extend inwardly from each ring to a hub 34. The hubs 35 are tapered cones which project forward of the rings 33. There are holes 36 extending into the hubs 35 from the rear ends thereof. These holes 36 receive the needle end 37 of a plastic plug 38. The rearward surface 39 of each plug 38 is spherical with a needle extension 40 projecting rearwardly of the surface 39.

As shown in FIGURE 3, a thin plate 41 extends rearwardly from the front plate 12 between the two holes 20 and 21. The plate 41 is in line with a plane through the axes of the sleeves 25 associated with the holes 20 and 21. There is a similarly oriented plate 41 between the two holes 23 and 24. The plates 41 have small holes 42 through them.

An air director retainer 43 is supported by each plate 41. Each air director retainer 43 has a pair of plates 44 on opposite sides of a plate 41 with holes through them corresponding to the hole 42. A pin 45 pivotally attaches the plates 44 to the plates 41.

The air director retainers 43 further comprise a plate member 46 to which the plates 44 are attached, or integrally molded, and at each end of the plate 46 there is a hollow frusto-conical bearing member 47. The needle extensions 40 of the plugs 38 extend into the bearing members 47, as shown in FIGURE 3 with spherical surfaces 39 bearing against the forward edges of the bearing members. The needle extensions 40 provide stops and prevent the plugs 38 from slipping out of the bearing members 47. When both of the plugs 38 are in place within the bearing members 47, they cause the plate 46 to bow slightly to create a spring force that urges the rings 33 firmly against the sleeves 25. However, the rings 33 are rotatable about the bearing members 47. The location of the center of the spherical surface of plugs 38 associated with each louver 29–32 coincides with the centers of the spherical surfaces 33 to increase the ease of rotation of the directors 29, 30, 31 and 32.

The central hole 22 through the front plate 12 has no movable air director, but only has three stationary spokes 50 which extend inwardly to a central hub 51. There may be a hole 52 through the center of the hub 51 for receiving the shaft of a control for the air conditioner, such as a blower control shaft which has a knob connected to its outer end.

When the panel assemblies are attached to the front of an evaporator coil housing 10, air which passes over the coils is directed from the housing through the air directors 29, 30, 31 and 32 and through the central hole 22 in the front plate 12. Since the panel 11 is curved, the air which is blown through these openings from the evaporator housing is easily directed toward each passenger. Furthermore, the air directors 29, 30, 31 and 32 are readily adjustable to provide complete control of the air direction.

In further reference to the direction of air through the air directors 29, 30, 31 and 32, FIGURE 9 shows how the air passes through one of these air directors, and may be contrasted to the way that air passes through a conventional outlet, as shown in FIGURE 10. In the first place, it can be seen that in FIGURE 9 there is a relatively smooth air flow path from the inside of the evaporator housing 10 past the area designated 55 to the mouth of the director 33, because of the converging shape of the director 33 in the direction of air flow. In contrast, the conventional air conditioner housing 60 and outlet 61 shown in FIGURE 10 requires an abrupt change in direction of the air as it engages the front wall 62 of the housing and must reverse to reach the mouth of the outlet 61. Furthermore, in this invention, the converging shape of each director 33 in the direction of air flow has a confining effect upon the stream of air which continues until about six inches beyond each director, at which point the air begins to diffuse and diverge. This aspect of the air director design provides greatly improved direction control over the air flow when each director is rotated. In contrast, as shown in FIGURE 10, the air which discharges from a conventional air conditioner begins to diverge and diffuse immediately and there is an immediate loss of control over the direction of the air stream.

Additional advantages of this air conditioner front panel assembly are its small number of parts and ease of assembly. In connection with the ease of assembly, it is equally easy to replace broken parts, if necessary. For example, to remove any one of the air directors 29, 30, 31 or 32, it is only necessary to engage the ends of the plate 46 and pull it rearwardly until the louvers are free. Then, of course, it is just as easy to install a new air director. Likewise, if the retainer 43 is to be replaced, it is only necessary to knock out the pin 45, position a new retainer 43, and replace the pin.

Various changes and modifications may be made within the process of this invention as will be readily apparent to those skilled in the art. Such changes and modifications are within the scope and teaching of this invention as defined by the claims appended hereto.

What is claimed is:

1. An air conditioner front panel assembly comprising a panel having a front plate, a plurality of holes through the front plate for the discharge of air, a sleeve surrounding each hole and extending rearwardly of the front plate, each sleeve having an inner surface which defines a segment of a sphere, the center of which is to the rear of such sleeve, a plurality of air directors each having a ring bearing against each sleeve, each ring having an outer surface defining a segment of a sphere, the center of which is to the rear of such ring, and means holding each ring in contact with its respective sleeve while permitting rotation of such ring about the center of its sphere comprising a support plug at the center and to the rear of each ring to which such ring is attached and a resilient arm connected to the rear side of the front plate and biased into bearing contact with the support plug.

2. A front panel assembly for an automobile air conditioner comprising a panel having a front plate with a plurality of holes through the front plate, a sleeve surrounding each hole and extending rearwardly of the front plate, each sleeve being divergent in a direction rearward of the plate, an air director through each hole comprising a ring for bearing against a sleeve, the ring also being divergent in a direction rearward of the front plate, a central hub connected to each ring by a plurality of spokes, each hub extending rearwardly of its respective ring, and means for pressing the rings against the sleeves, comprising a retainer fastened to the rear side of the front plate between each pair of holes, each retainer comprising a spring-like plate, the ends of which bear against the rearward ends of the hubs of a pair of directors to hold the directors in place while permitting movement of the directors to adjust the direction of air flow.

3. The panel assembly of claim 2 wherein the ends of the spring-like plates have holes in them and the rear ends of the hubs are tapered to fit within the holes, whereby any director can be removed by pulling rearwardly the plate that bears against its hub.

References Cited in the file of this patent

UNITED STATES PATENTS

| 2,513,463 | Eklund et al. | July 4, 1950 |
|---|---|---|
| 2,696,087 | Luecke | Dec. 7, 1954 |
| 2,747,495 | Muller | May 29, 1956 |
| 2,755,729 | Galbraith et al. | July 24, 1956 |
| 2,756,664 | McCuen | July 31, 1956 |
| 2,895,313 | Flick | July 21, 1959 |
| 2,998,714 | Bonzer | Sept. 5, 1961 |

FOREIGN PATENTS

| 589,037 | Italy | Feb. 24, 1959 |
|---|---|---|
| 847,834 | Great Britain | Sept. 14, 1960 |